(12) United States Patent
Inui et al.

(10) Patent No.: US 8,685,586 B2
(45) Date of Patent: Apr. 1, 2014

(54) FUEL CELL SEPARATOR

(75) Inventors: Fumihiko Inui, Toyota (JP); Seiji Sano, Gotemba (JP); Takashi Kajiwara, Gotemba (JP); Sho Usami, Susono (JP); Makoto Ueno, Mishima (JP); Yuichi Yagami, Susono (JP); Norihiko Nakamura, Mishima (JP); Hiromichi Sato, Atsugi (JP); Yoshifumi Ota, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1482 days.

(21) Appl. No.: 11/666,417

(22) PCT Filed: Dec. 1, 2005

(86) PCT No.: PCT/JP2005/022518
§ 371 (c)(1),
(2), (4) Date: Apr. 27, 2007

(87) PCT Pub. No.: WO2006/062147
PCT Pub. Date: Jun. 15, 2006

(65) Prior Publication Data
US 2008/0152988 A1      Jun. 26, 2008

(30) Foreign Application Priority Data
Dec. 8, 2004   (JP) ................. 2004-354872

(51) Int. Cl.
*H01M 8/02* (2006.01)
*H01M 8/10* (2006.01)

(52) U.S. Cl.
CPC .......... *H01M 8/0247* (2013.01); *H01M 8/0258* (2013.01); *H01M 8/0206* (2013.01); *H01M 8/0297* (2013.01); *H01M 2008/1095* (2013.01)
USPC ............ 429/457; 429/514; 429/452; 429/465

(58) Field of Classification Search
CPC ............ H01M 8/0202; H01M 8/0206; H01M 8/0247; H01M 8/0254; H01M 8/0256; H01M 8/0258; H01M 8/029; H01M 2008/10957
USPC .......... 429/452, 454–458, 465, 468, 512–514
See application file for complete search history.

(56) References Cited

U.S. PATENT DOCUMENTS

| 4,826,742 A | 5/1989 | Reiser |
| 5,366,818 A | 11/1994 | Wilkinson et al. |

(Continued)

FOREIGN PATENT DOCUMENTS

| CA | 2 447 433 A1 | 11/2002 |
| CA | 2 493 554 A1 | 2/2004 |

(Continued)

OTHER PUBLICATIONS

Machine translation of Ichikawa et al., JP 05-109415 A.*

(Continued)

*Primary Examiner* — Edu E Enin-Okut
(74) *Attorney, Agent, or Firm* — Oliff PLC

(57) ABSTRACT

The separator of which the region facing the MEA is a flat includes the first electrode facing plate and the second electrode facing plate. The separator includes the reaction gas supply manifold to which the reaction gas is supplied. The first electrode facing plate includes a plurality of reaction gas supply holes formed at the end of the cell-reaction region. The intermediate plate includes a plurality of reaction gas supply path slits that forms the reaction gas supply paths, wherein each of the reaction gas supply paths has one end connected to the reaction gas supply manifold and other end connected to at least one of the plurality of reaction gas supply holes.

15 Claims, 10 Drawing Sheets

(56) References Cited

U.S. PATENT DOCUMENTS

| | | | |
|---|---|---|---|
| 5,770,327 A * | 6/1998 | Barnett et al. | 429/460 |
| 6,248,466 B1 | 6/2001 | Takahashi et al. | |
| 6,638,657 B1 | 10/2003 | Cisar et al. | |
| 2002/0055028 A1 * | 5/2002 | Ghosh et al. | 429/34 |
| 2003/0039875 A1 | 2/2003 | Horiguchi et al. | |
| 2003/0113608 A1 | 6/2003 | Hong et al. | |
| 2003/0232234 A1 | 12/2003 | Cisar et al. | |
| 2004/0001993 A1 | 1/2004 | Kinkelaar et al. | |
| 2004/0038114 A1 | 2/2004 | Wariishi et al. | |
| 2004/0137305 A1 | 7/2004 | Inoue et al. | |
| 2005/0074662 A1 | 4/2005 | Cho et al. | |
| 2007/0292738 A1 | 12/2007 | Yagami et al. | |

FOREIGN PATENT DOCUMENTS

| | | | | |
|---|---|---|---|---|
| CA | 2 587 673 A1 | 6/2006 | | |
| EP | 1 170 556 A1 | 1/2002 | | |
| EP | 1 457 750 A1 | 9/2004 | | |
| JP | 03257760 A * | 11/1991 | | H01M 8/02 |
| JP | 05029001 A * | 2/1993 | | H01M 8/02 |
| JP | 05109415 A * | 4/1993 | | H01M 8/02 |
| JP | A 6-218275 | 8/1994 | | |
| JP | A-8-287934 | 11/1996 | | |
| JP | A-11-233126 | 8/1999 | | |
| JP | A 2001-148252 | 5/2001 | | |
| JP | A-2002-208412 | 7/2002 | | |
| JP | A-2003-197217 | 7/2003 | | |
| JP | A-2003-197223 | 7/2003 | | |
| JP | 2004006104 A * | 1/2004 | | H01M 8/02 |
| JP | A 2004-6104 | 1/2004 | | |
| JP | A-2004-193125 | 7/2004 | | |
| JP | A 2004-303558 | 10/2004 | | |
| JP | A 2005-38738 | 2/2005 | | |
| JP | A-2005-216581 | 8/2005 | | |
| WO | WO 2004/051765 A2 | 6/2004 | | |
| WO | WO 2006/062242 A1 | 6/2006 | | |

OTHER PUBLICATIONS

Machine translation for Asakawa et al., JP 2004-006104 A.*
Office Action issued for Chinese Application No. 200780001628.1 on Jan. 29, 2010 (with translation).
May 10, 2012 Office Action issued in U.S. Appl. No. 12/531,086.
Oct. 26, 2011 Office Action issued in U.S. Appl. No. 12/159,903.

* cited by examiner

Fig.3
(a)
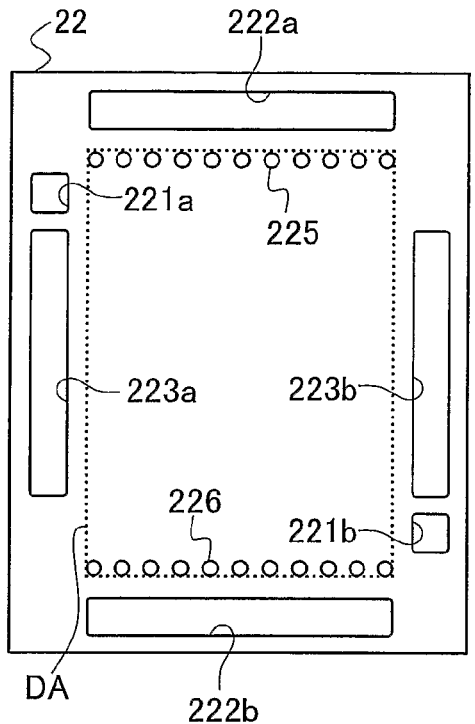
(b)
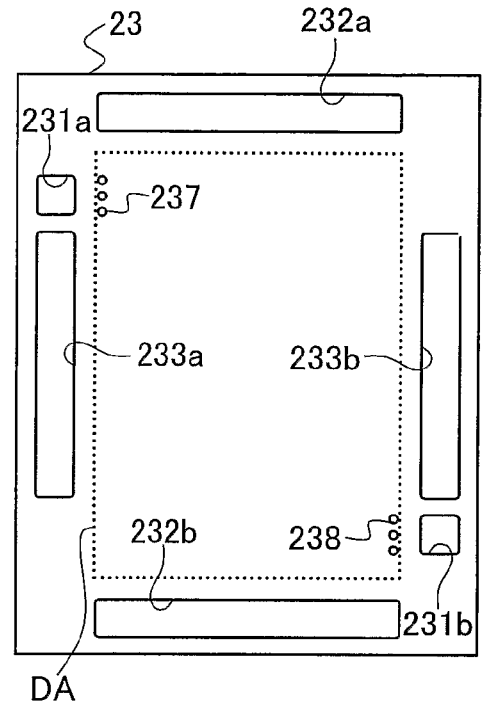
(c)
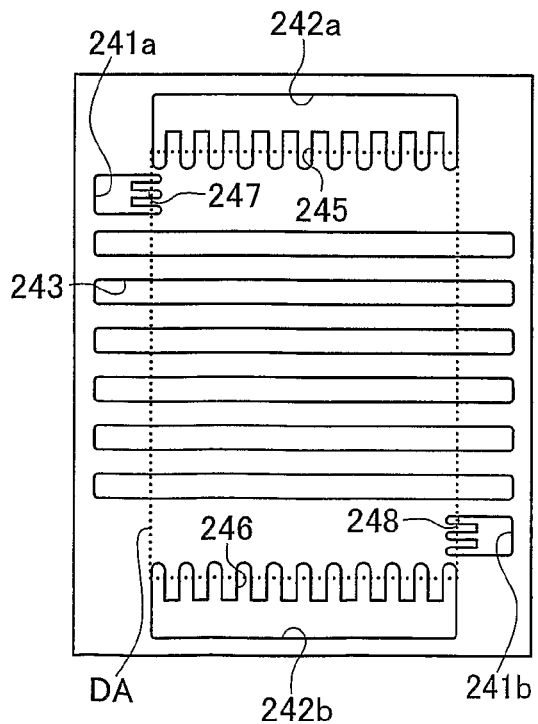
(d)
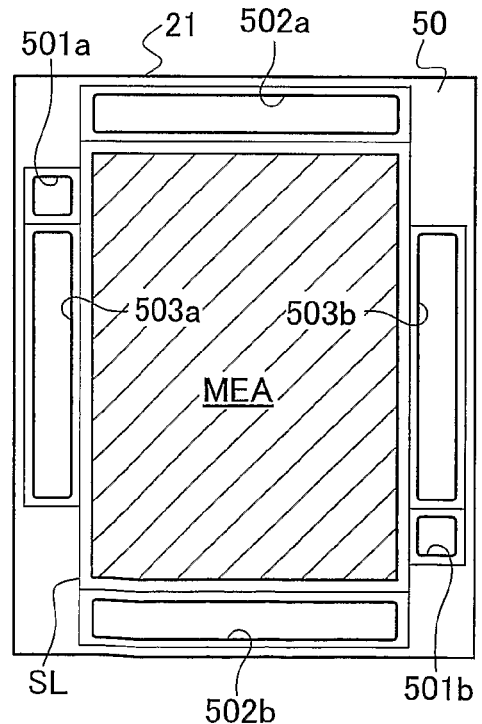

Fig.4
(a)
(c) sl2-sl2 cross section
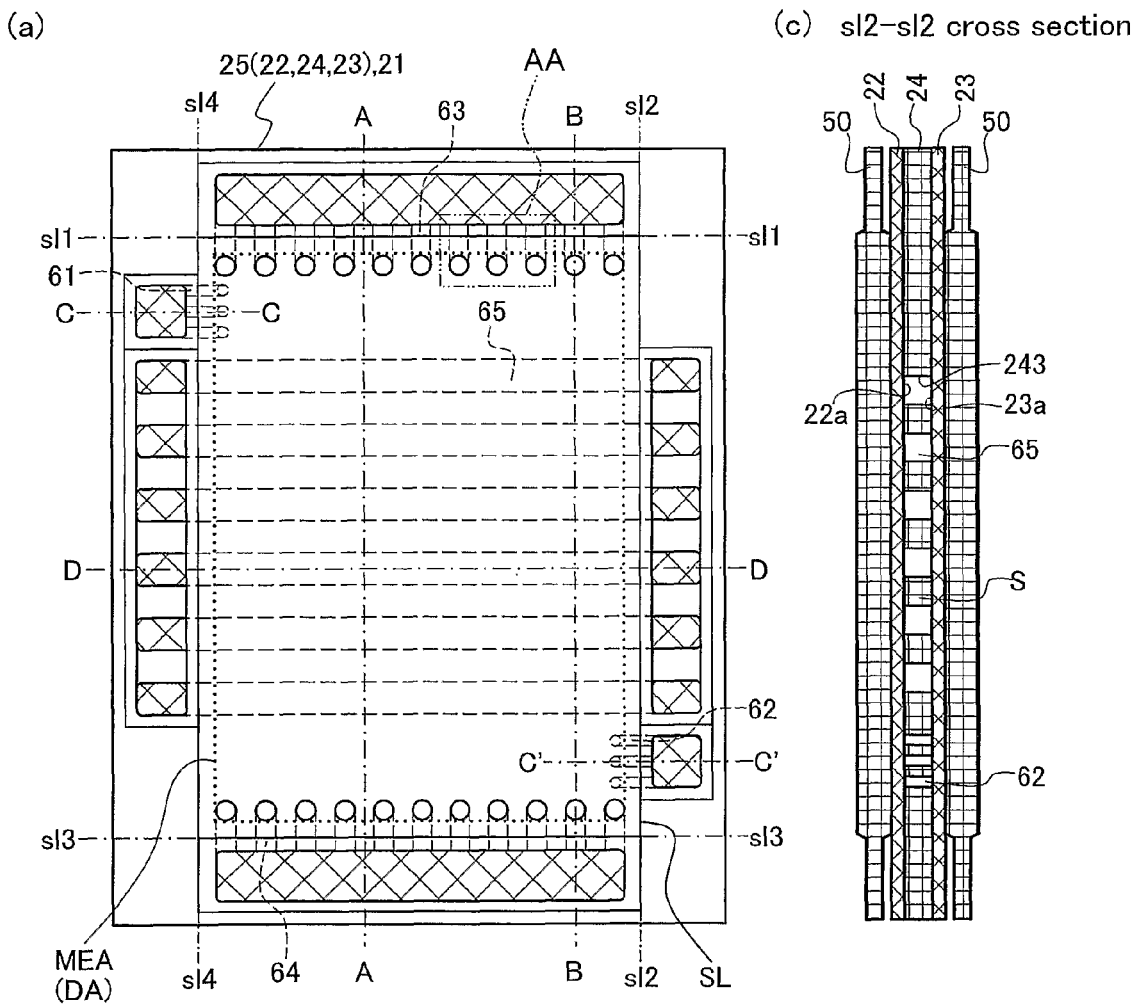
(b)
sl1-sl1 cross section
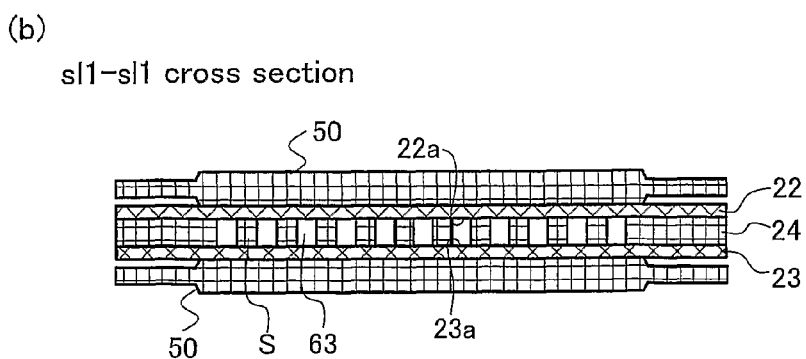

Fig.8
(a)
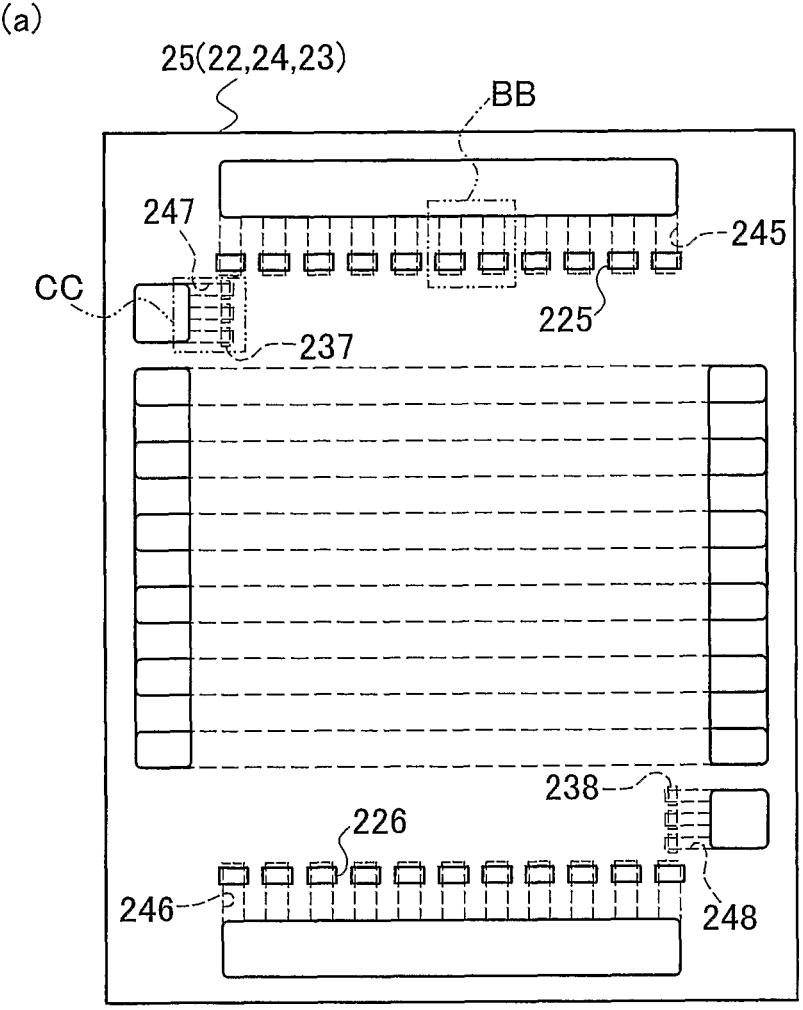
(b)
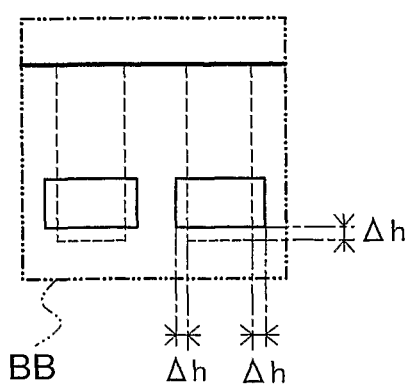
(c)
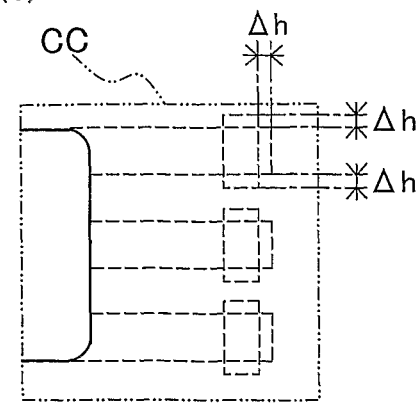

Fig.10
(a)
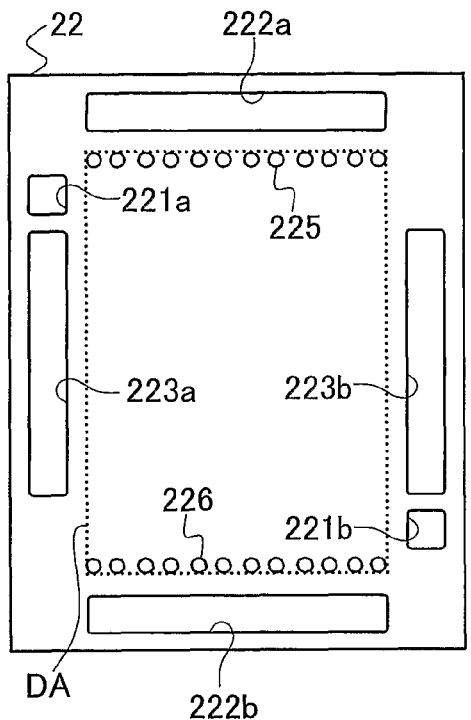
(b)
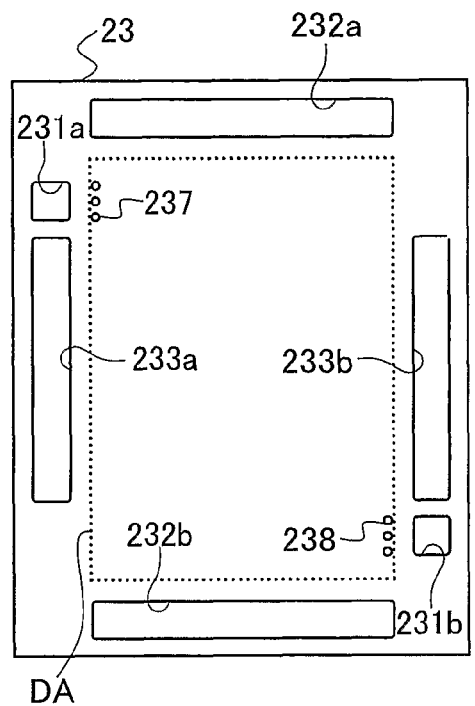
(c)
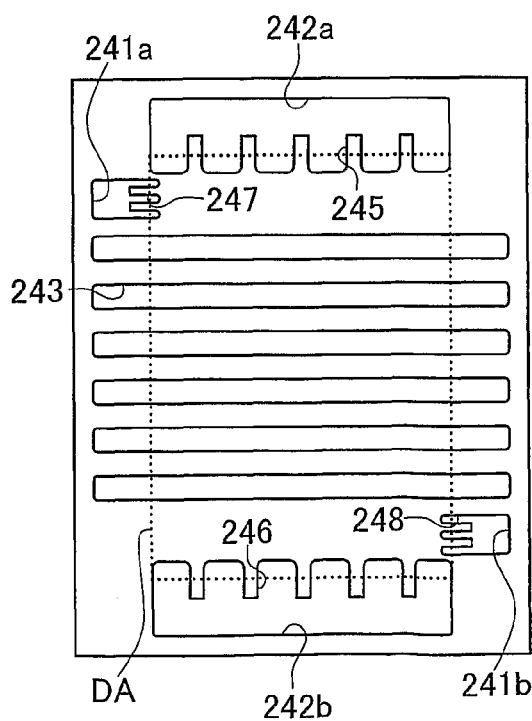
(d)
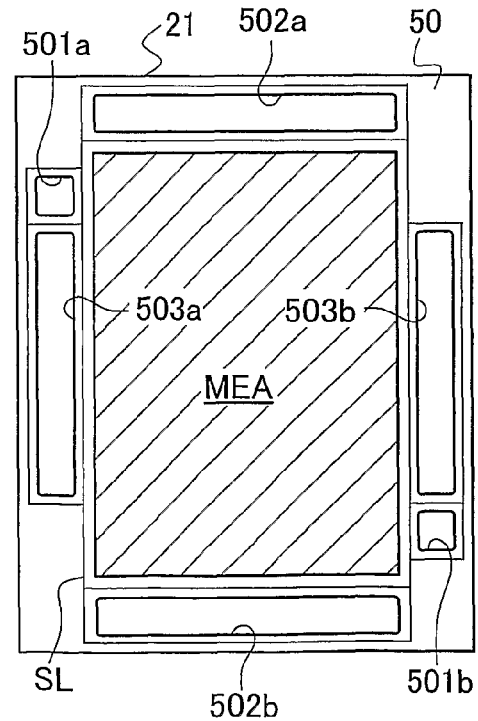

FUEL CELL SEPARATOR

TECHNICAL FIELD

The present invention relates to a fuel cell separator, and specifically relates to the supply of reaction gas.

BACKGROUND ART

With a fuel cell, for example, a proton-exchange membrane fuel cell (PEFC), by supplying a fuel gas containing hydrogen and an oxidation gas containing oxygen respectively to two electrodes (an cathode and an anode) facing against each other while sandwiching an electrolytic membrane, performs the reactions shown in the following equation (1) and equation (2), and the chemical energy is directly converted to electrical energy.

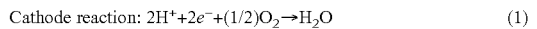

Cathode reaction: $2H^+ + 2e^- + (1/2)O_2 \rightarrow H_2O$ (1)

Anode reaction: $H_2 \rightarrow 2H^+ + 2e^-$ (2)

As the major structure of the fuel cell, a so-called stack structure is developed. The stack structure of fuel cell has substantially flat shaped membrane electrode assemblies (MEA) and separators that are laminated and joined in the lamination direction.

Here, known as a fuel cell separator is an item having a three layer structure constituted from an anode side plate, a cathode side plate, and an intermediate plate sandwiched between the cathode side plate and the anode side plate. This three layer structure separator includes a reaction gas manifold piercing the three plates, a transfer path provided in the intermediate plate, and long hole shaped through holes provided at the end of the half etched reaction gas flow path at the anode side and cathode side plates. Then, the reaction gas is distributed to the reaction gas flow path via the long hole shaped through holes from the transfer path.

However, with the prior art described above, because the through holes provided on the anode side and cathode side plates are long hole shaped, so when using for a separator for which a reaction gas flow path is not provided in the anode side and cathode side plates (hereafter called a flat separator), there is the risk of the reaction gas supply becoming unstable. Specifically, with the flat separator, because a reaction gas flow path is not provided in the anode side and cathode side plates, these plates can be made thin and flat. In this case, when the strength of the part at which the long hole shaped through holes are formed is insufficient, with deformation, the reaction gas supply becomes unstable, and there was the risk of the fuel cell performance decreasing. Also, because the flat separator does not have the reaction gas flow path in the anode side and cathode side plates, the flat separator cannot control the distribution of the reaction gas by the reaction gas flow path. With the prior art described above, no consideration is made for uniformity of reaction gas distribution when the reaction gas flow path is not provided. Because of this, there was also the risk of the reaction gas distribution becoming uneven, causing a decrease in the fuel cell performance.

DISCLOSURE OF THE INVENTION

An object of the present invention, which is intended to address the conventional drawbacks noted above, is to improve the reaction gas supply and to increase the performance of the fuel cell using flat separator.

To achieve the above object, the aspect of the invention provides a fuel cell separator comprising: a first electrode facing plate having a first cell-reaction region facing a first electrode of a membrane electrode assembly, wherein the first cell-reaction region is flat; a second electrode facing plate having a second cell-reaction region facing a second electrode of the membrane electrode assembly, wherein the second cell-reaction region is flat; and an intermediate plate held between the first electrode facing plate and the second electrode facing plate. In the fuel cell separator of the aspect of the invention, the first electrode facing plate, the second electrode facing plate and the intermediate plate respectively comprise a reaction gas supply manifold opening that forms a reaction gas supply manifold to which the reaction gas is supplied, wherein the reaction gas supply manifold pierces the separator in the thickness direction. The first electrode facing plate further comprises a plurality of reaction gas supply holes that pierce the first electrode facing plate in the thickness direction and are formed at an end of the first cell-reaction region. The intermediate plate further comprises a plurality of reaction gas supply path openings that form reaction gas supply paths, wherein each of the reaction gas supply paths has one end connected to the reaction gas supply manifold and other end connected to at least one of the plurality of reaction gas supply holes formed on the first electrode facing plate, wherein the plurality of reaction gas supply path openings pierce the intermediate plate in the thickness direction.

The separator of the aspect of the invention is provided with a plurality of gas supply holes connected with the reaction gas supply paths. Therefore, compared to when the reaction gas supply hole is formed by one long hole, The area of piercing part of the first electrode facing plate is smaller, so the strength of the first electrode facing plate is increased. As a result, even when the first electrode facing plate is made into a thin plate, it is possible to realize stable supply of reaction gas to the first electrode.

In the separator of the aspect of the invention, the number of the reaction gas supply path openings and the number of the reaction gas supply holes may be same, and the reaction gas supply path openings may correspond one-to-one with the reaction gas supply holes. In this case, because the area of piercing part of the intermediate plate is smaller, there is further improvement in the separator strength. As a result, it is possible to realize an even more stable supply of reaction gas.

In the separator of the aspect of the invention, the flow volume of reaction gas supplied from the plurality of reaction gas supply holes to the first electrode may be controlled according to the shape and the dimension of the reaction gas supply path and the reaction gas supply holes. In this case, It is possible to easily control the flow volume of reaction gas supplied from each reaction gas supply hole, and possible to stabilize the distribution of reaction gas to the first electrode.

In the separator of the aspect of the invention, when constituting a fuel cell, the porous layer arranged between the first electrode and the first electrode facing plate may function as the reaction gas flow path for flowing the reaction gas. And the pressure loss of the reaction gas for the reaction gas supply paths and the reaction gas supply holes may be greater than the pressure loss of the reaction gas for the porous layer, whereby the flow volume of the reaction gas supplied from the plurality of reaction gas supply holes to the first electrode may be controlled by the pressure loss of the reaction gas for the reaction gas supply path and the reaction gas supply holes. In this case, rather than a porous layer for which flow volume control is difficult, it is possible to easily control the flow volume of the reaction gas at the separator.

In the separator of the aspect of the invention, the plurality of reaction gas supply path openings respectively may have the same shape and dimensions. In this case, the pressure loss for each reaction gas supply path may be made uniform for each reaction gas supply path. As a result, the uniformity of the supply of reaction gas to the first electrode is increased.

In the separator of the aspect of the invention, the plurality of reaction gas supply holes respectively may have the same shape and dimensions. In this case, the pressure loss for the plurality of reaction gas supply holes may be made uniform for each reaction gas supply hole. As a result, it is possible to make uniform the flow volume of the reaction gas that passes through each reaction gas supply path and the reaction gas supply holes. Therefore, the uniformity of the supply of reaction gas to the first electrode is increased.

In the separator of the aspect of the invention, a plurality of reaction gas supply path openings may be formed to be respectively parallel to each other. In this case, The direction of supplying of the reaction gas to the cell-reaction region is fixed, so the reaction gas supply is stabilized.

In the separator of the aspect of the invention, the first electrode facing plate may include a cathode facing plate that faces the cathode electrode. The reaction gas supply manifold may include an oxidation gas supply manifold for supplying oxidation gas. And the plurality of reaction gas supply path openings may include oxidation gas supply path openings for flowing the oxidation gas, arranged from one end across to the other end of one edge of the first cell-reaction region. In this case, oxidation gas which has worse diffusibility than fuel gas can be supplied uniformly across the entire first electrode.

In the separator of the aspect of the invention, the first electrode facing plate, the second electrode facing plate and the intermediate plate further respectively may comprise a reaction gas exhaust manifold opening that forms a reaction gas exhaust manifold from which reaction gas is exhausted, wherein the reaction gas exhaust manifold pierces the separator in the thickness direction. The first electrode facing plate further may comprise a plurality of reaction gas exhaust holes that pierce the first electrode facing plate in the thickness direction and are formed at an end of the first cell-reaction region and of the side opposite the end at which the reaction gas supply holes are formed. And the intermediate plate further may comprise a plurality of reaction gas exhaust path openings that form reaction gas exhaust paths, wherein each of the reaction gas exhaust paths has one end connected to the reaction gas exhaust manifold and other end connected to at least one of the plurality of reaction gas exhaust holes, wherein the plurality of reaction gas exhaust path openings pierce the intermediate plate in the thickness direction. In this case, it is possible to increase the strength of the part of the reaction gas exhaust hole for the first electrode.

In the separator of the aspect of the invention, a width of the reaction gas supply hole or the reaction gas exhaust hole may be wider than a width of the connected reaction gas supply path or the connected reaction gas exhaust path. In this case, when displacement occurs in the surface direction between the intermediate plate and the first electrode facing plate due to imposition error or the like, it is possible to suppress reduction or disappearance of the connection area between the reaction gas supply path and the reaction gas supply hole.

In the separator of the aspect of the invention, at least one of the first electrode facing plate and the second electrode facing plate may comprise a first layer and a second layer. The first layer may have a contact surface with the intermediate plate. The second layer may have a facing surface facing the membrane electrode assembly when constituting the fuel cell, and the second layer may be made of a material having a higher corrosion resistance than a material of the first layer. In this case, It is possible to increase the corrosion resistance of the surface that contacts the membrane electrode assembly for which corrosion occurs easily. For example, the combination of the material of the first layer and the material of the second layer may be one of the following: a) the first layer is stainless steel and the second layer is titanium or a titanium alloy b) the first layer is titanium and the second layer is a titanium palladium alloy.

In the separator of the aspect of the invention, the reaction gas supply manifold opening, the reaction gas supply holes, and the reaction gas supply path openings may be formed by a punch cutting process. And the reaction gas exhaust manifold opening, the reaction gas exhaust holes, and the reaction gas exhaust path openings may be formed by a punch cutting process. In this case, the first and second electrode facing plates and the intermediate plate of the aspect noted above may easily be made by the punch cutting process which is a processing method with high productivity. Therefore, it is possible to increase separator productivity.

The above and other objects, features, aspects, and advantages of the present invention will become more apparent from the following detailed description and the accompanying drawings.

BRIEF DESCRIPTION OF THE DRAWINGS

FIG. 3 shows a plan view of each structural part of the separator and the seal integrated type MEA.

FIG. 4 shows a plan view and cross section view of the overlapping statue of the separator and the seal integrated type MEA.

FIG. 8 shows a plan view of the separator of the first variation.

FIG. 10 shows a plan view of each structural part of the separator of the third variation and the seal integrated type MEA.

BEST MODES OF CARRYING OUT THE INVENTION

Embodiments of the invention will be illustrated with referring the drawings.

A. Embodiment

Figure 1:
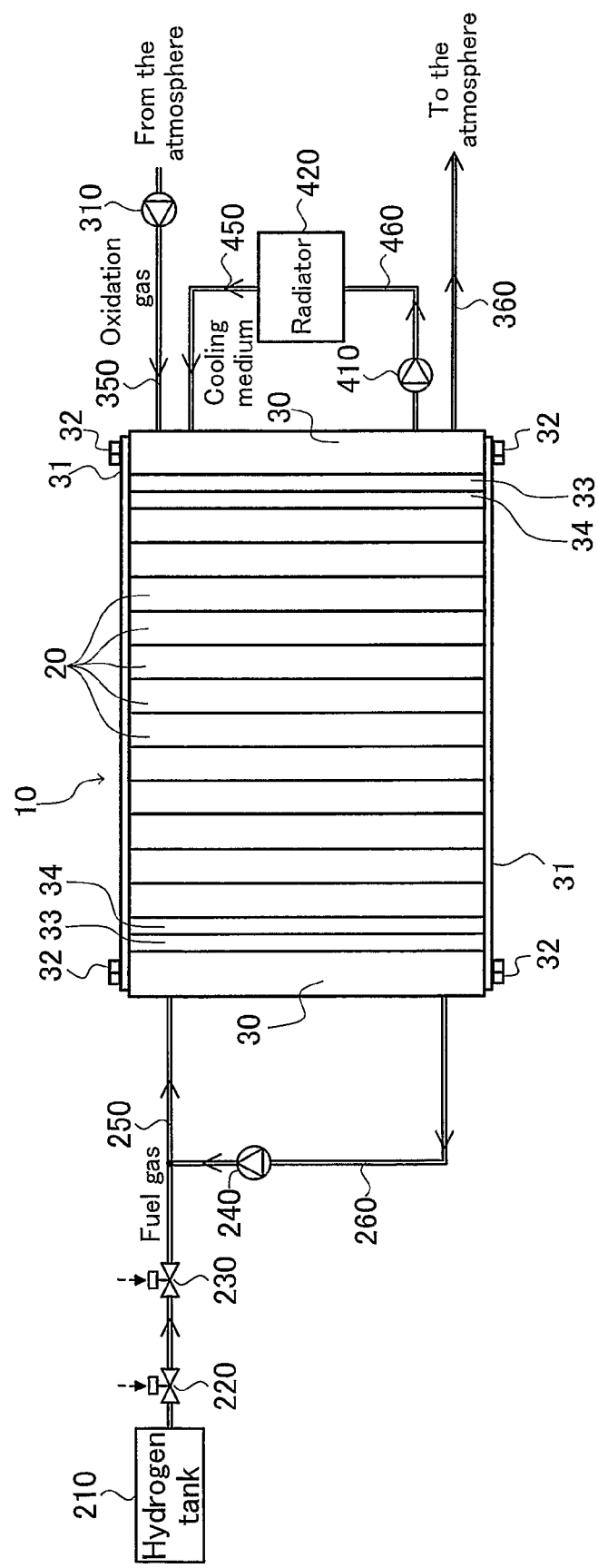
FIG. 1 schematically illustrates the construction of a fuel cell constituted using the separator of the embodiment.
Figure 2:
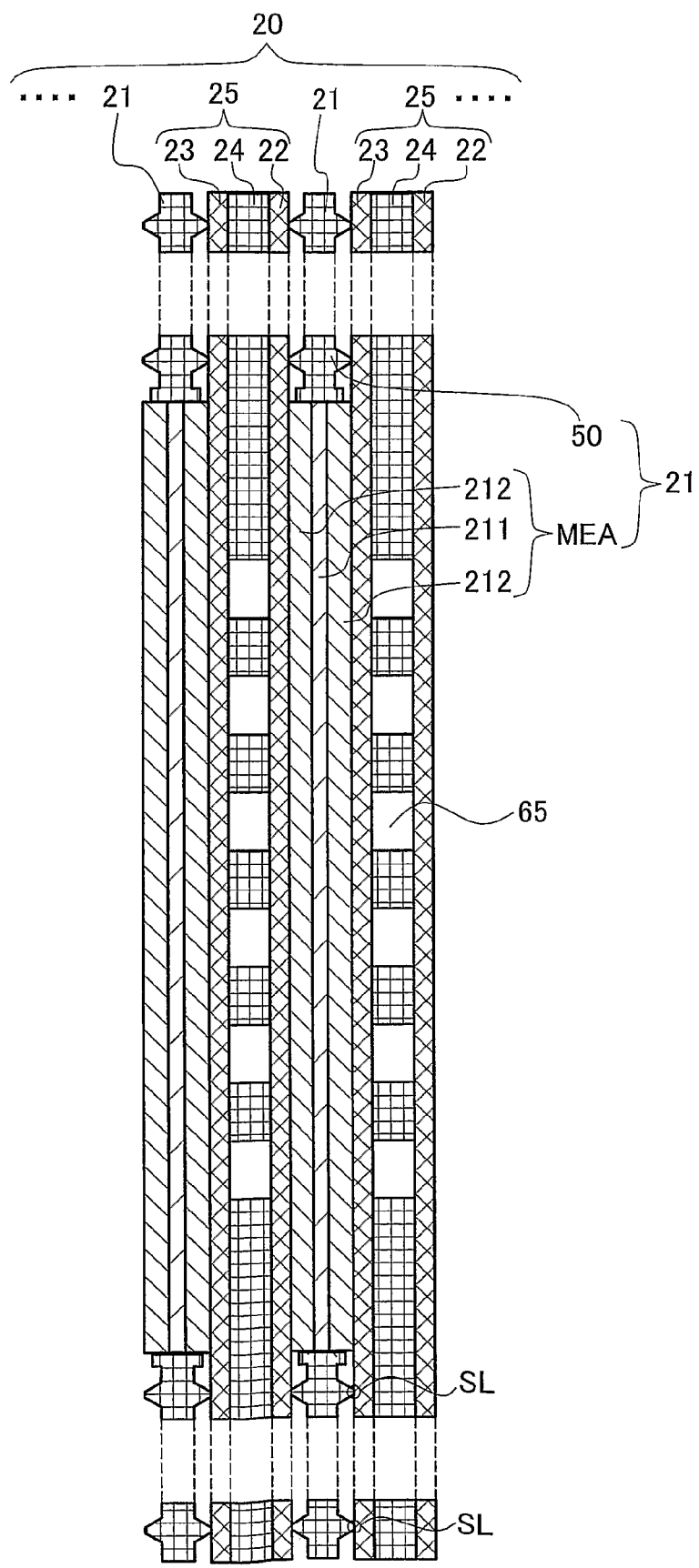
FIG. 2 schematically illustrates the structure of the module that constitutes the fuel cell of the embodiment.

Fuel Cell and Separator Construction
Referring to FIG. 1 to FIG. 3, the schematic constitution of the separator of the embodiment and a fuel cell constituted using the separator of the embodiment are described. FIG. 1 schematically illustrates the construction of a fuel cell constituted using the separator of the embodiment. FIG. 2 schematically illustrates the structure of the module that constitutes the fuel cell of the embodiment. FIG. 3 shows a plan view of each structural part of the separator and the seal integrated type membrane electrode assembly (MEA).

The fuel cell 10 is a proton-exchange membrane fuel cell (PEFC) which is relatively compact and excellent in terms of power generating efficiency. The fuel cell 10 includes a plurality of modules 20, an end plate 30, a tension plate 31, an insulator 33, and a terminal 23. The plurality of modules 20 sandwiches the insulator 33 and the terminal 23 and are held between the two end plates 30. Specifically, the fuel cell 10 has a layered structure whereby the plurality of modules 20 are laminated. Also, by the tension plate 31 being bonded to each of the end plates 30 by the bolt 32, each module 20 is joined by a specified compression force in the lamination direction.

Supplied to the fuel cell 10 are the reaction gas (fuel gas and oxidation gas) supplied for the cell reaction, and the cooling medium for cooling the fuel cell 10. To give a brief description, hydrogen is supplied via the pipe 250 as fuel gas to the anode of the fuel cell 10 from the hydrogen tank 210 in which high pressure hydrogen is stored. Instead of the hydrogen tank 210, it is also possible to generate hydrogen using a reforming reaction with alcohol, hydrocarbon, or the like as raw materials. To adjust the supply of hydrogen, a shut valve 220 and a pressure adjustment valve 230 are arranged in the pipe 250. The hydrogen exhausted from the anode of the fuel cell 10 is returned to the pipe 250 via the pipe 260, and is again circulated in the fuel cell 10. A circulation pump 240 for circulation is arranged on the pipe 260.

Air is supplied as oxidation gas to the cathode of the fuel cell 10 from the air pump 310 via the pipe 350. The air exhausted from the cathode of the fuel cell 10 is discharged into the atmosphere via the pipe 360. A cooling medium is further supplied to the fuel cell 10 from the radiator 420 via the pipe 450. As the cooling medium, it is possible to use water, non-freezing water such as ethylene glycol, air, or the like. The cooling medium exhausted from the fuel cell 10 is sent to the radiator 420 via the pipe 460 and is circulated again in the fuel cell 10. A circulation pump 410 for circulation is arranged on the pipe 460.

As shown in FIG. 2, the module 20 is constituted with alternate lamination of the separator 25 and the seal integrated type MEA 21.

As shown in FIG. 2, the separator 25 includes a cathode facing plate 22 facing the cathode electrode side of the seal integrated type MEA 21, an anode facing plate 23 facing the anode electrode side, and an intermediate plate 24 held between the cathode facing plate 22 and the anode facing plate 23. These three plates are overlaid and joined by a hot press.

The cathode facing plate 22 is a substantially quadrilateral metal thin plate. The metal thin plate may be titanium, titanium alloy, or SUS (stainless steel) plate plated on the surface for corrosion prevention, for example. As shown in FIG. 3 (*a*), the cathode facing plate 22 has the cell-reaction region DA that is the part facing the cathode electrode, the cell-reaction region DA being flat, and an oxidation gas flow path is not formed on the cell-reaction region DA. The cathode facing plate 22 includes at the outer peripheral edge of the outside of the cell-reaction region DA the fuel gas supply manifold forming opening 221*a*, the fuel gas exhaust manifold forming opening 221*b*, the oxidation gas supply manifold forming opening 222*a*, the oxidation gas exhaust manifold forming opening 222*b*, the cooling medium supply manifold forming opening 223*a*, and the cooling medium exhaust manifold forming opening 223*b*. The cathode facing plate 22 further includes a plurality of oxidation gas supply holes 225 and a plurality of oxidation gas exhaust holes 226. The plurality of oxidation gas supply holes 225 are arranged on the top edge part of the cell-reaction region DA in FIG. 3 (*a*). The plurality of oxidation gas supply holes 225 are arranged aligned across the cell-reaction region DA from the left edge to the right edge. The plurality of oxidation gas exhaust holes 226 are arranged at the end of the side opposite to the oxidation gas supply holes 225 of the cell-reaction region DA, in other words, at the bottom edge in FIG. 3 (*a*). The plurality of oxidation gas exhaust holes 226 are arranged aligned across the cell-reaction region DA from the left edge to the right edge. These various types of manifold forming openings, oxidation gas supply holes 225, and oxidation gas exhaust holes 226 are all formed as piercing parts that pierce the cathode facing plate 22 in the thickness direction. With the cathode facing plate 22, the part other than these piercing parts is a flat plate left unprocessed. Therefore, the cathode facing plate 22 is produced simply by performing the punch cutting process on a substantially quadrilateral metal thin plate.

The anode facing prate 23 is a substantially quadrilateral metal thin plate of the same size as the cathode facing plate 22. The material of the anode facing plate 23 may use the same material as the cathode facing plate 22. As shown in FIG. 3 (*b*), the same as with the cathode facing plate 22, the cell-reaction region DA of the anode facing plate 23 is flat, and a fuel gas flow path is not formed on the cell-reaction region DA. The anode facing plate 23 includes at the same position as the cathode facing plate 22 the fuel gas supply manifold forming opening 231*a*, the fuel gas exhaust manifold forming opening 231*b*, the oxidation gas supply manifold forming opening 232*a*, the oxidation gas exhaust manifold forming opening 232*b*, the cooling medium supply manifold forming opening 233*a*, and the cooling medium exhaust manifold forming opening 233*b*. The anode facing plate 23 further includes a plurality of fuel gas supply holes 237 and a plurality of fuel gas exhaust holes 238. The plurality of fuel gas supply holes 237 are arranged aligned at the top of the left edge of the cell-reaction region DA in FIG. 3 (*b*). The plurality of fuel gas exhaust holes 238 are arranged aligned at the edge on the side opposite the fuel gas supply holes 237 of the cell-reaction region DA, in other words, arranged aligned at the bottom of the right edge in FIG. 3 (*a*). These various types of manifold forming openings, the fuel gas supply holes 237, and the fuel gas exhaust holes 238 are all formed as piercing parts that pierce the anode facing plate 23 in the thickness direction. With the anode facing plate 23, the part other than these piercing parts is a flat plate left unprocessed. The anode facing plate 23, the same as the cathode facing plate 22, is produced simply by performing the punch cutting process on a substantially quadrilateral metal thin plate.

The intermediate plate 24 is a substantially quadrilateral metal thin plate of the same size as the cathode facing plate 22 and the anode facing plate 23. The material can also use the same material as that of the cathode facing plate 22 and the anode facing plate 23. As shown in FIG. 3 (*c*), the intermediate plate 24 includes at the same position as that of the cathode facing plate 22 and the anode facing plate 23 the fuel gas supply manifold forming opening 241*a*, the fuel gas exhaust manifold forming opening 241*b*, the oxidation gas supply manifold forming opening 242*a*, and the oxidation gas exhaust manifold forming opening 242*b*.

As shown in FIG. 3 (*c*), the plurality of oxidation gas supply path slits 245 having a long hole shape are formed aligned on the intermediate plate 24. One end of the plurality of oxidation gas supply path slits 245 are connected to the oxidation gas supply manifold forming opening 242*a*. The other end of the plurality of oxidation gas supply path slits 245 are connected to the oxidation gas supply holes 225 formed on the cathode facing plate 22 during joining. The oxidation gas supply path slits 245 are formed in the same number as the oxidation gas supply holes 225 so as to have one-to-one correspondence with the oxidation gas supply holes 225. Then, the plurality of oxidation gas supply path slits 245 are mutually parallel, and are perpendicular to the upper edge of the cell-reaction region DA. The plurality of oxidation gas supply path slits 245 are arranged across the range facing from the left edge to the right edge of the cell-reaction region DA. Also, formed on the intermediate plate 24 are a plurality of oxidation gas exhaust path slits 246 which are long holes having the same shape as that of the oxidation gas supply path slits 245. One end of the plurality of oxidation gas exhaust path slits 246 is connected to the oxidation gas exhaust manifold forming openings 242b. The other end of the plurality of oxidation gas exhaust path slits 246 is connected to the oxidation gas exhaust holes 226 formed on the cathode facing plate 22 during joining. Similarly, on the intermediate plate 24 are formed a plurality of fuel gas supply path slits 247 and a plurality of fuel gas exhaust path slits 248. One end of the fuel gas supply path slit 247 is connected to the fuel gas supply manifold forming opening 241a, and the other end of the fuel gas supply path slit 247 is connected to the other and of the fuel gas supply hole 237 of the anode facing plate 23. One end of the fuel gas exhaust path slit 248 is connected to the fuel gas exhaust manifold forming opening 241b, and the other end of the fuel gas exhaust path slit 248 is connected to the fuel gas exhaust hole 238 of the anode facing plate 23.

The intermediate plate 24 further includes a plurality of cooling medium flow path slits 243. The plurality of cooling medium flow path slits 243 are long holes that reach from the right side end area to the left side edge area in FIG. 3 (*c*) of the intermediate plate 24. The plurality of cooling medium flow path slits 243 are formed aligned in the vertical direction in FIG. 3 (*c*).

For the intermediate plate 24, the various types of manifold forming openings and the various types of path slits described above are all piercing parts that pierce the intermediate plate 24 in the thickness direction. Other than these piercing parts, the intermediate plate 24 is a flat plate left unprocessed. Therefore, the intermediate plate 24, the same as with the cathode facing plate 22 and the anode facing plate 23, is produced simply by performing the punch cutting process on a substantially quadrilateral metal thin plate.

As shown in FIG. 3 (*d*), the seal integrated type MEA 21 includes an MEA and a sealing member 50. The sealing member 50 is joined to the outer edge part of the MEA. As shown in FIG. 2, the MEA includes an electrolytic membrane 211 made from an ion exchange membrane, an anode electrode that is not illustrated, a cathode electrode that is not illustrated, and a porous layer 212. The anode electrode is a catalytic layer arranged on one surface of the electrolytic membrane 211. The cathode electrode is a catalytic layer arranged on the other surface of the electrolytic membrane 211. The porous layer 212 is arranged on the surface of each catalytic layer (electrode) facing the separator. The porous layer 212 has a relatively high internal porosity, whereby the pressure loss for the porous layer 212 is small when the reaction gas (oxidation gas and fuel gas) is flowed internally. The cathode side porous layer 212 is constituted using a metal (e.g. titanium) porous sheet. The anode side porous layer 212 is constituted using a carbon porous sheet. The porous layer 212 will be described further later.

The sealing member 50 uses a resin material such as silicon rubber, butyl rubber, fluorine rubber, for example. The sealing member 50 is produced by having the outer edge part of the MEA approach the metal cavity and injection molding a resin material. By working in this way, the membrane electrode assembly 21 and the sealing member 50 are joined without a gap, and it is possible to prevent leaking out of the oxidation gas and fuel gas from the joint part. The sealing member 50, the same as the cathode facing plate 22 and the anode facing plate 23, includes an oxidation gas supply manifold forming opening 501a, an oxidation gas exhaust manifold forming opening 501b, a fuel gas supply manifold forming opening 502a, a fuel gas exhaust manifold forming opening 502b, a cooling medium supply manifold forming opening 503a, and a cooling medium exhaust manifold forming opening 503b. As shown in FIG. 2, the sealing member 50 seals between the separator 25 that contacts one surface of the sealing member 50 and the separator 25 that contacts the other surface of the sealing member 50 when constituting the fuel cell 10. As shown in FIG. 3 (*d*), the sealing member 50 is sealed so as to enclose around the outer edge of the MEA or the cell-reaction region DA of the fuel cell and the outer edge of each manifold. With FIG. 3 (*d*), to make it easier to see the drawing, for the sealing member 50, the seal line SL that indicates the contact part with the separator 25 is shown.

Figure 5:
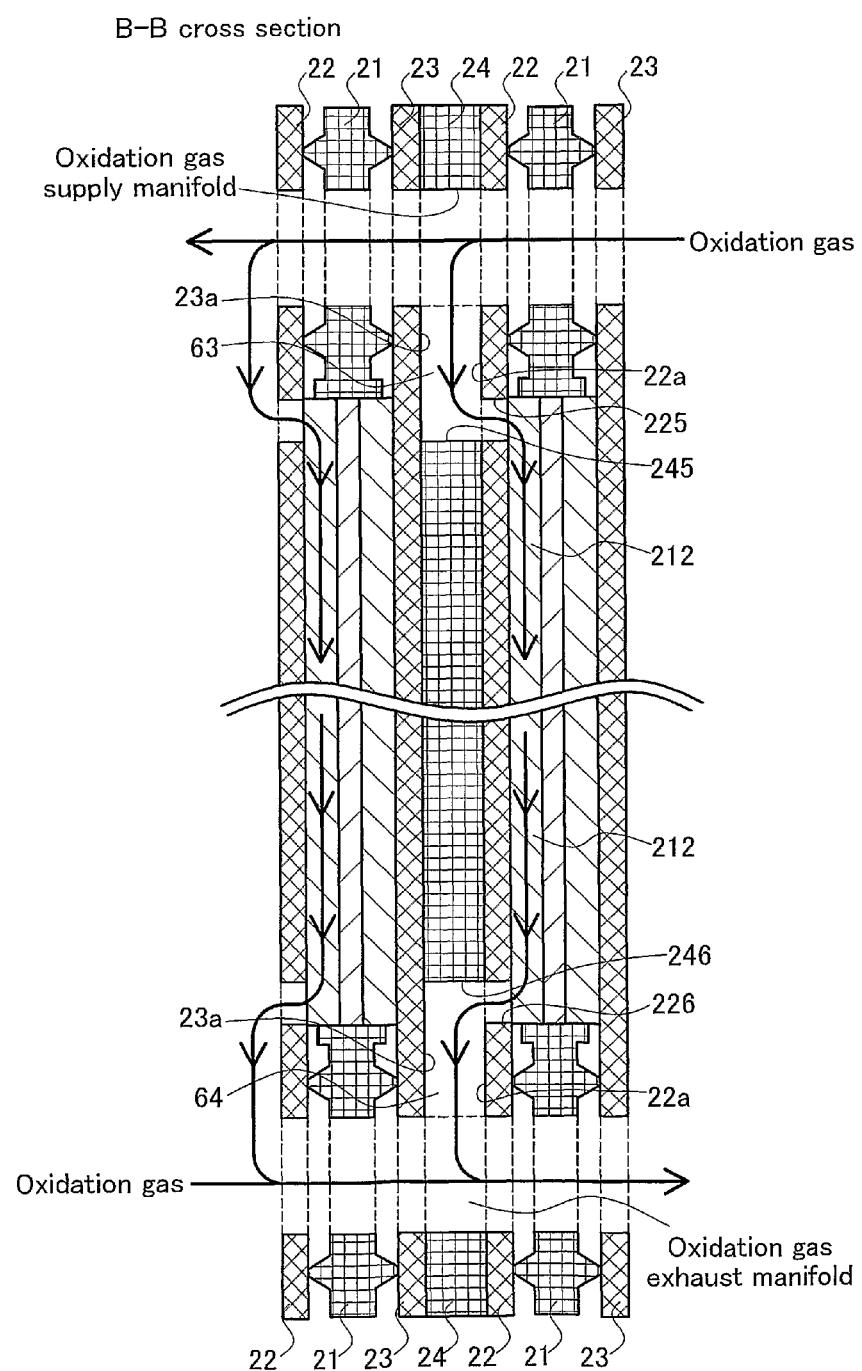
FIG. 5 shows a cross section view of the B-B cross section in FIG. 4.
Figure 6:
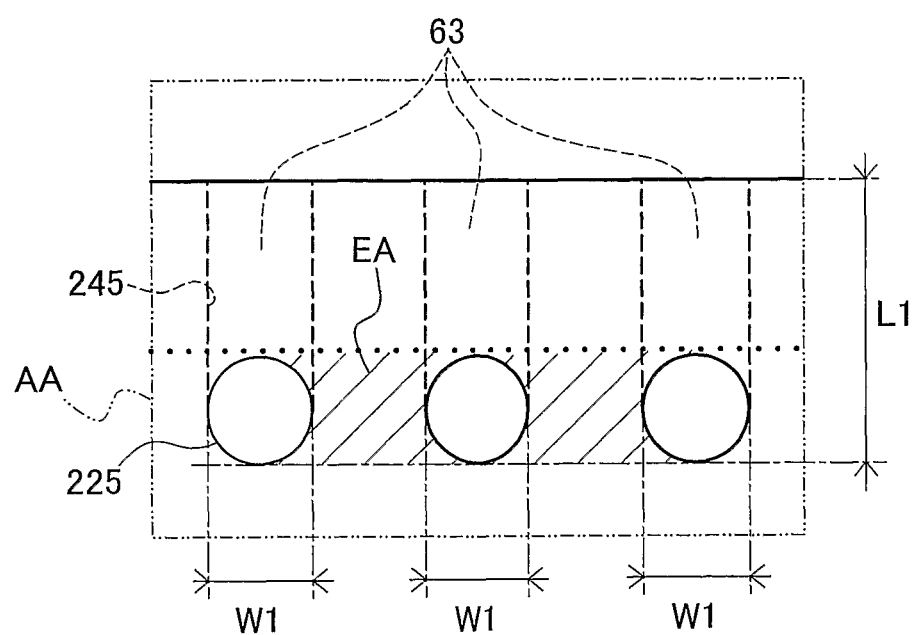
FIG. 6 schematically illustrates an expanded view of the AA part of FIG. 4.
Figure 7:
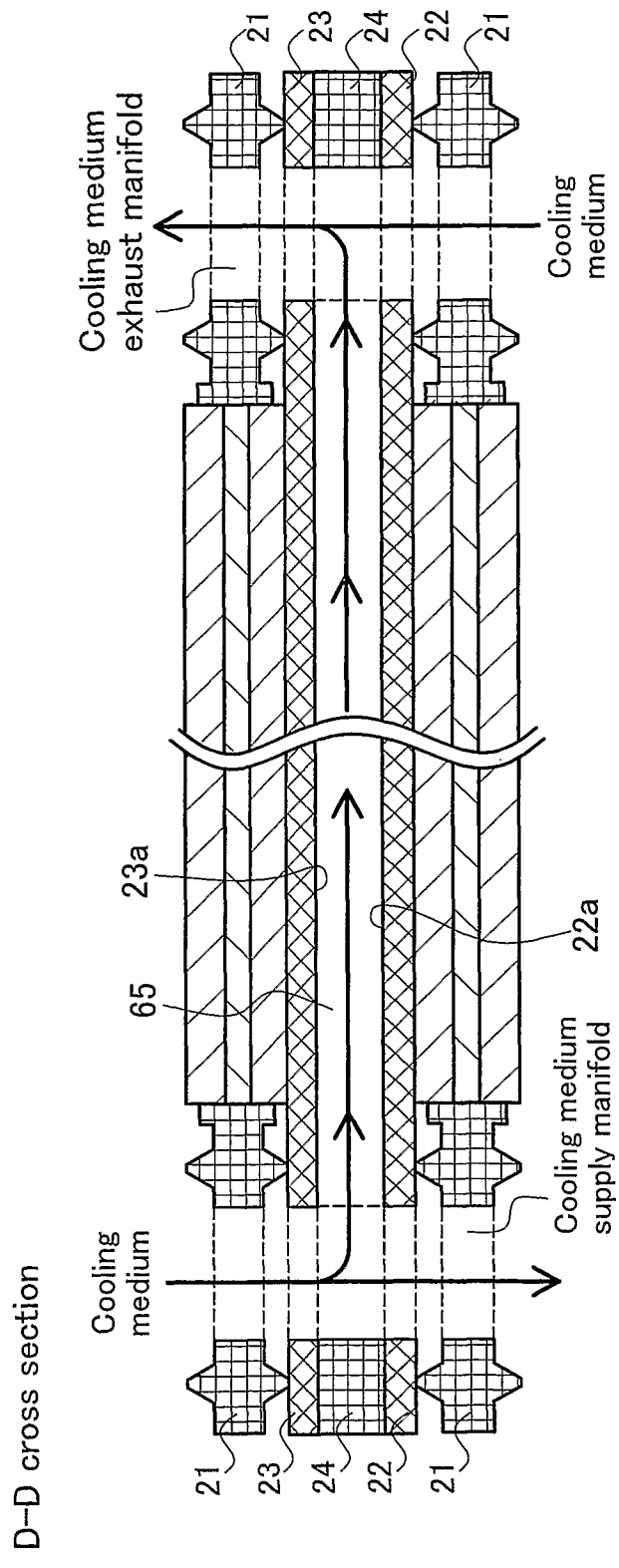
FIG. 7 shows a cross section view of the D-D cross section in FIG. 4.

The constitution of each type of path formed on the separator 25 will be described while referring to FIG. 4 to FIG. 7. FIG. 4 shows a plan view and cross section view of the overlapping statue of the separator and the seal integrated type MEA FIG. 5 shows a cross section view of the B-B cross section in FIG. 4. FIG. 6 schematically illustrates an expanded view of the AA part of FIG. 4. FIG. 7 shows a cross section view of the D-D cross section in FIG. 4. Also, FIG. 2 described above corresponds to the A-A cross section of FIG. 4.

As shown by the cross hatching in. FIG. 4 (*a*), formed on the separator 25 are the various types of manifold that pierce in the thickness direction. For example, the fuel gas supply manifold is formed by fuel gas supply manifold forming opening 221a, the fuel gas supply manifold forming opening 231a, and the fuel gas supply manifold forming opening 241a formed respectively on the cathode facing plate 22, the anode facing plate 23, and the intermediate plate 24 described above. Similarly, on the separator 25 are respectively formed the fuel gas exhaust manifold, the oxidation gas supply manifold, the oxidation gas exhaust manifold, the cooling medium supply manifold, and the cooling medium exhaust manifold.

As shown in FIG. 4 and FIG. 5, on the separator 25, the oxidation gas supply path 63 is formed by the oxidation gas supply path slit 245 formed on the intermediate plate 24, the contact surface 23a of the intermediate plate 24 on the anode facing plate 23, and the contact surface 22a of the intermediate plate 24 on the cathode facing plate 22. The oxidation gas supply path 63 has one end connected to the oxidation gas supply manifold and the other end connected to the oxidation gas supply hole 225 formed on the cathode facing plate 22.

Here, as shown in FIG. 6, each of the oxidation gas supply path slits 245 formed on the intermediate plate 24 respectively has the same shape and dimensions. In specific terms, as shown in FIG. 6, for each of the oxidation gas supply path slits 245, the length L1 from one end connected to the oxidation gas supply manifold to the other end connected to the oxidation gas supply hole 225 is the same for each. The flow path width W1 of each oxidation gas supply hole 225 is also the same for each. Furthermore, the plurality of oxidation gas supply holes 225 also each have the same shape and dimensions. In specific terms, with this embodiment, these are round through holes having the same diameter. As a result, the pressure loss of the oxidation gas for a route (oxidation gas supply route) from the oxidation gas supply manifold through the oxidation gas supply path 63 and oxidation gas supply hole 225 to the porous layer 212 is equal for each route.

As shown in FIG. 4 and FIG. 5, the separator 25 includes the oxidation gas exhaust path 64. The oxidation gas exhaust path 64 is formed by the oxidation gas exhaust path slit 246 formed on the intermediate plate 24, the contact surface 23a of the intermediate plate 24 on the anode facing plate 23, and the contact surface 22a of the intermediate plate 24 on the cathode facing plate 22. The oxidation gas exhaust path 64 has one end connected to the oxidation gas exhaust manifold and the other end connected to the oxidation gas exhaust hole 226 formed on the cathode facing plate 22.

Though not illustrated, it has the same structure as the C-C cross section and C'-C' cross section in FIG. 4 (a) and the B-B cross section shown in FIG. 5. Specifically, the separator 25 includes the fuel gas supply path 61 at the C-C area shown in FIG. 4 (a). The same as with the oxidation gas supply path 63 described above, the fuel gas supply path 61 is formed by the fuel gas supply path slit 247 formed on the intermediate plate 24, the contact surface 23a of the intermediate plate 24 on the anode facing plate 23, and the contact surface 22a of the intermediate plate 24 on the cathode facing plate 22. Then, the separator 25 includes the fuel gas exhaust path 62 at the C'-C' area in FIG. 4 (a). The same as the oxidation gas exhaust path 64 described above, the fuel gas exhaust path 62 is formed by the fuel gas exhaust path slit 248 formed on the intermediate plate 24, the contact surface 23a of the intermediate plate 24 on the anode facing plate 23, and the contact surface 22a of the intermediate plate 24 on the cathode facing plate 22. Then, the same as with the oxidation gas supply path slit 245 and the oxidation gas supply hole 225, each fuel gas supply path slit 247 and each fuel gas supply hole 237 has the same shape and dimensions so that the pressure loss of the fuel gas is equal in the respective fuel gas supply route.

As shown in FIG. 4 and FIG. 7, the cooling medium flow path 65 is formed on the separator 25 by the cooling medium flow path slit 243 formed on the intermediate plate 24, the contact surfaced 23a of the intermediate plate 24 on the anode facing plate 23, and the contact surface 22a of the intermediate plate 24 on the cathode facing plate 22. The cooling medium flow path 65 has one end connected to the cooling medium supply manifold and the other end connected to the cooling medium exhaust manifold.

Also, as shown in FIG. 4 (a), the fuel gas supply manifold, the fuel gas exhaust manifold, the oxidation gas supply manifold, and the oxidation gas exhaust manifold each are positioned outside the cell-reaction region outer edge seal part. The cell-reaction region outer edge seal part is a contact part enclosing the outer edge of the fuel cell cell-reaction region DA among the contact parts of the seal part 50 and the separator 25 (FIG. 4 (a): Seal line SL). Meanwhile, the oxidation gas supply hole 225, the oxidation gas exhaust hole 226, the fuel gas supply hole 237, and the fuel gas exhaust hole 238 are each positioned at the end part of the cell-reaction region DA, in other words, inside the cell-reaction region outer edge seal part described above. As a result, the fuel gas supply path 61, the fuel gas exhaust path 62, the oxidation gas supply path 63, and the oxidation gas exhaust path 64 each tunnel through the cell-reaction region outer edge seal part from within the separator 25. Also, similarly, the cooling medium flow path 65 is connected to the cooling medium supply manifold and the cooling medium exhaust manifold respectively positioned at the outside of the cell-reaction region outer edge seal part, and tunnels through the cell-reaction region outer edge seal part from within the separator 25.

FIG. 4 (b) shows a cross section of sl1-sl1 of FIG. 4 (a), in other words, a cross section of the separator 25 and the seal integrated type MEA 21 on the cell-reaction region outer edge seal part. As shown in FIG. 4 (b), the cross section on the cell-reaction region outer edge seal part has the space parts on which the oxidation gas supply path 63 is formed and the solid part S are aligned alternately. As a result, the solid part S becomes a support, suppressing the deformation of the cathode facing plate 22 and the anode facing plate 23 due to seal pressure. Note that the sl3-sl3 cross section in FIG. 4 (a) also has the same structure.

FIG. 4 (c) shows the sl2-sl2 cross section in FIG. 4 (a), in other words, the cross section of the separator 25 and the seal integrated type MEA 21 on the cell-reaction region outer edge seal part. In this cross section as well, the space part on which the cooling medium flow path 65 and the fuel gas exhaust path 62 are formed and the solid part S are aligned alternately. As a result, the solid part S becomes a support, suppressing deformation of the cathode facing plate 22 and the anode facing plate 23 due to seal pressure. Note that the sl4-sl4 cross section in FIG. 4 (a) has the same constitution.

Fuel Cell Operation:

Similarly, the operation of the fuel cell constituted using the separator of the embodiment and the separator of the embodiment is described while referring to FIG. 4 to FIG. 7.

The oxidation gas supplied to the fuel cell 10, as shown by the arrow in FIG. 5, passes through the oxidation gas supply route described above that is the route of the oxidation gas supply manifold—oxidation gas supply path 63—oxidation gas supply hole 225, and the oxidation gas is supplied to the cathode side porous layer 212. The oxidation gas supplied to the porous layer 212 is provided to the electrochemical reaction at the cathode electrode. After that, as shown by the arrow in FIG. 5, the oxidation gas passes through the oxidation gas exhaust hole 226—oxidation gas exhaust path 64—oxidation gas exhaust manifold, and the oxidation gas exhausted to the outside. Here, as described above, the porous layer 212 has high porosity and sufficiently low pressure loss when flowing the oxidation gas, so distribution of the flow volume of the oxidation gas supplied to the cathode through each oxidation gas supply route depends on the respective pressure loss of each oxidation gas supply route. Then, the pressure loss of the oxidation gas supply route substantially depends on the shape and dimension of the oxidation gas supply path slit 245 and the oxidation gas supply hole 225. Therefore, the distribution of the flow volume of the reaction gas supplied through each oxidation gas supply route to the cathode is controlled by the shape and dimensions of the oxidation gas supply path slit 245 and the oxidation gas supply hole 225.

With this embodiment, as described while referring to FIG. 6, the oxidation gas supply path slit 245 and the oxidation gas supply hole 225 have the same shape and dimensions so that the pressure loss of each oxidation gas supply route will be equal. Therefore, the flow volume of the oxidation gas supplied to the cathode through each oxidation gas supply route is equal for each oxidation gas supply route.

The same as with oxidation gas, the fuel gas supplied to the fuel cell 10 passes through the fuel gas supply route described above that is a route of the fuel gas supply manifold—fuel gas supply path 61—fuel gas supply hole 237, and the fuel gas is supplied to the anode side porous layer 212. The fuel gas supplied to the porous layer 212 is diffused across the entire cell-reaction region DA (not illustrated) and provided for the electrochemical reaction for the anode electrode. After that, the fuel gas, the same as with the oxidation gas, passes through the fuel gas exhaust hole 238—fuel gas exhaust path 62—fuel gas exhaust manifold, and the fuel gas is exhausted to the outside.

The same as with the fuel gas supply route, the shape and dimensions of each fuel gas supply path slit 247 and each fuel gas supply hole 237 are respectively the same. Therefore, the flow volume of the fuel gas supplied to the anode through each fuel gas supply route is equal for each fuel gas supply route.

As shown by the arrow in FIG. 7, the cooling medium supplied to the fuel cell 10 passes through the cooling medium supply manifold—the cooling medium flow path 65—the cooling medium exhaust manifold, and the cooling medium is exhausted to the outside. The cooling medium cools the fuel cell 10 by absorbing the thermal energy of the fuel cell 10 mainly in the flow within the cooling medium flow path 65.

As described above, with the separator 25 of this embodiment, rather than one long hole, a plurality of the oxidation gas supply holes 225 are provided for each oxidation gas supply path slit 245. Therefore, the strength of the oxidation gas supply hole 225 part for the separator 25 increases, stabilizing the oxidation gas supply. Furthermore, by being able to ensure the strength of the oxidation gas supply hole 225 part, it is possible to make the cathode facing plate 22 a thin plate, making it possible to make the fuel cell 10 compact. Furthermore, the separator 25 is in contact with the porous layer 212 even in the area between one oxidation gas supply hole 225 and other oxidation gas supply hole 225 adjacent to each other (the area shown by cross hatching in FIG. 6). Therefore, even for the area corresponding to the cross hatched part described above of the MEA, the same power generation is performed as the center part of the cell-reaction region DA, so the fuel cell performance improves. Also, at the cross hatched part described above of the separator 25, by restraining the porous layer 212, it is possible to suppress deformation of the porous layer 212. Specifically, when the oxidation gas supply hole 225 is one long hole, it is possible for deformation such as bending of the porous layer 212 part to occur, but with this embodiment, this is suppressed. As a result, at the oxidation gas supply hole 225 part and its peripheral area, the contact resistance between the porous layer 212 and the separator 25 is decreased, and the fuel cell performance is increased.

Furthermore, for the oxidation gas exhaust hole 226, the fuel gas supply hole 237, and the fuel gas exhaust hole 238 part as well, there is the same constitution as the oxidation gas supply hole 225, so for the oxidation gas exhaust hole 226 part, the fuel gas supply hole 237 part, and the fuel gas exhaust hole 238 part as well, the same operation and effect can be obtained.

Also, the oxidation gas flow path formed on the entire cell-reaction region DA of the cathode facing plate 22 by the half etching process for conventional separators is not formed for the separator 25 of this embodiment. For the fuel cell 10 of this embodiment, the porous layer 212 plays the role of the oxidation gas flow path. In this case, to realize a uniform supply of oxidation gas, control of the distribution of the oxidation gas is an issue. Specifically, with conventional fuel cells, the pressure loss when oxidation gas flows is controlled by the shape (width, depth, and the like) of the oxidation gas flow path formed on the separator by the half etching process. By doing this, it is possible to make uniform the flow volume of the oxidation gas flowed to each part of the cell-reaction region DA. However, for the fuel cell 10 of this embodiment, controlling the pressure loss of the porous layer 212 which plays the role of the oxidation gas flow path to be uniform at each part of the cell-reaction region DA is difficult. This is because it is difficult to control the size and distribution of the fine holes formed on the porous layer 212.

In light of this, with this embodiment, using an item with sufficiently high porosity as the porous layer 212 sufficiently lowers the pressure loss at the porous layer 212. By doing this, the pressure loss at the oxidation gas supply route described above (the oxidation gas supply path slit 245 and the oxidation gas supply hole 225) is the main factor in determining the flow volume of the oxidation gas supplied to each site of the cell-reaction region DA. Specifically, the flow volume of the supplied oxidation gas is controlled by the shape and dimensions of the oxidation gas supply path 63 and the oxidation gas supply hole 225 that determine the pressure loss of the oxidation gas supply route. As a result, it is possible to stably supply oxidation gas to the cell-reaction region DA without being affected by variation of pressure loss at the porous layer 212.

Furthermore, with this embodiment, the shape and size of the oxidation gas supply path slit 245 and the oxidation gas supply hole 225 are made the same, so the pressure loss for the plurality of oxidation gas supply path is the same. Because of this, the flow volume of the oxidation gas supplied from the plurality of oxidation gas supply holes 225 is equal for each of the oxidation gas supply holes 225. As a result, the oxidation gas can be supplied uniformly across the entire cell-reaction region DA.

Furthermore, at the separator 25 of this embodiment, the plurality of oxidation gas supply path slits 245 are arranged in parallel extending from one edge to the other edge along one side of the cell-reaction region DA (extending from the left edge to the right edge of the upper side of the cell-reaction region DA with the example in FIG. 4). As a result, it is possible to more uniformly supply the oxidation gas to the cell-reaction region DA.

Note that with this embodiment, the fuel gas supply path slit 247 is not formed extending from one edge to the other edge of one side of the cell-reaction region DA. The fuel gas (hydrogen) has a faster diffusion speed than the oxidation gas (oxygen in the air). The diffusion speed depends mainly on the diffusion coefficient and the concentration gradient. The hydrogen diffusion coefficient is approximately four times the oxygen diffusion coefficient. Also, in contrast to the fact that the fuel gas uses pure hydrogen (hydrogen concentration approximately 100%), the oxygen gas uses air (oxygen concentration approximately 20%). Because of this, we can see that the diffusion speed of the oxygen in the oxidation gas is quite low compared to that of the hydrogen in the fuel gas. Because of this, if the fuel gas supply hole 237 is formed at one small part of one side of the cell-reaction region DA, it is possible to sufficiently supply the hydrogen necessary for the cell reaction. To say this another way, with the electrochemical reaction of the fuel cell, the diffusion speed of the oxygen molecules is slow, so generally, there is a rate limit to the reaction ($2H^+ + 2e^- + (1/2)O_2 \rightarrow H_2O$) at three phase interface of the cathode. Therefore, using a flow path arrangement that focuses on supply capacity of oxidation gas is linked to further improvement in the fuel cell performance.

Also, the supply and exhaust of the reaction gas (oxidation gas and fuel gas) are performed by the path (the fuel gas supply path 61, the fuel gas exhaust path 62, the oxidation gas supply path 63, and the oxidation gas exhaust path 64) that tunnels through the cell-reaction region outer edge seal part from inside the separator 25, so the contact part with the sealing member 50 is flat, and the seal properties between separators and separators are excellent.

Also, the cooling medium flow path 65 is included within the separator 25 and the cell-reaction region DA (MEA) of the fuel cell 10 is cooled, so it is possible to suppress degradation of the MEA.

Furthermore, as described while referring to FIGS. 4 (*b*) and (*c*), at the cross section above the cell-reaction region outer edge seal part, so that the space part and the solid part are arranged alternately, a plurality of the fuel gas supply paths 61, the fuel gas exhaust paths 62, the oxidation gas supply paths 63, the oxidation gas exhaust paths 64, and the cooling medium flow paths 65 are aligned in the seal direction. As a result, deformation of the cathode facing plate 22 and the anode facing plate 23 due to seal pressure is suppressed. Therefore, it is possible to suppress worsening of the seal properties and the blocking of these paths 61 to 65 due to deformation of the cathode facing plate 22 and the anode facing plate 23. Note that the suppression of deformation described above makes it possible to make the cathode facing plate 22 and the anode facing plate 23 into thin plates.

Also, the facing surface of the separator 25 to the MEA (the MEA side surface of the cathode facing plate 22 and the anode facing plate 23) is a flat surface, so the contact properties between the MEA and the separator 25 is good. Specifically, the MEA is in contact with the separator 25 across the entire surface, so it is possible to make the contact pressure uniform on the inner surface. Furthermore, since the shape is not molded on plates 22, 23, 24, it is possible to suppress manufacturing variations for each separator 25, and to suppress variation of the contact pressure between each MEA and separator 25 contained in the fuel cell 10. As a result, the contact resistance between the MEA and the separator 25 is decreased and the fuel cell performance is increased.

Furthermore, it is possible to reduce the required compression pressure in the lamination direction, and to reduce the damage due to compression pressure on the structural parts of the fuel cell 10 (the MEA and the separator). Therefore, the durability of the fuel cell 10 is increased.

Furthermore, the separator 25 has three flat plates (the cathode facing plate 22, the anode facing plate 23, and the intermediate plate 24) joined, so the joining properties between each of the flat plates is good. As a result, the contact resistance within the separator 25 is decreased and the fuel cell performance is increased. With this embodiment, the three plates are joined using a hot press, but in addition to this, it is also possible to use various joining methods such as diffused junction, brazing, welding, or the like. In particular, this embodiment has all of the three plates as flat plates, so joining is easy, making the flexibility of the joining methods greater.

Furthermore, the fuel cell 10 of this embodiment uses the seal integrated MEA 21 for which the MEA part and the sealing member 50 are integrated, so the module 20 has a simple structure with the separator 25 and the seal integrated type MEA 21 alternately laminated. Therefore, the fuel cell productivity is increased.

Variations:

The separator 25 of the first variation is described while referring to FIG. 8. FIG. 8 shows a plan view of the separator of the first variation. FIG. 8 (*a*) shows the plan view of the entire separator 25. FIG. 8 (*b*) shows an expanded plan view of the part AA in FIG. 8 (*a*). FIG. 8 (*c*) shows an expanded plan view of the part BB of FIG. 8 (*a*). For this variation, only the structural parts that are different from the separator 25 of the embodiment described above are described, and the description of the same structural parts is omitted.

As shown in FIG. 8 (*b*), the oxidation gas supply hole 225 is formed as substantially a quadrilateral at the cathode facing plate 22 of the separator 25 of the first variation. Then, the width of the oxidation gas supply hole 225 is formed wider by 2×Δh than the width of the oxidation gas supply path slit 245 (the width of the oxidation gas supply path 63). Therefore, when the three flat plates are joined to form the separator 25, even when the cathode facing plate 22 displaced in the left-right direction of FIG. 8 (*b*) in relation to the intermediate plate 24, as long as the displacement volumes in both the left and right directions are within Δh, there is no decrease in the connection area between the oxidation gas supply path 63 and the oxidation gas supply hole 225. The plurality of oxidation gas supply paths 63 have deformation due to seal pressure suppressed as described above, so a certain level of gap is required, but by slightly widening the width of the oxidation gas supply hole 225 in this way, it is possible to make the distribution of the supplied oxidation gas more uniform at the cathode side cell-reaction region DA.

Furthermore, the furthest end part of the oxidation gas supply path slit 245 in the direction connecting with the oxidation gas supply hole 225 projects by an amount of Δh in the same direction for the planar view from the farthest end point of the same direction for the oxidation gas supply hole 225. Therefore, when the three flat plates are joined to form the separator 25, due to imposition error, even when the cathode facing plate 22 is displaced in the downward direction in FIG. 8(*b*) in relation to the intermediate plate 24, if the displacement volume is within Δh in the downward direction, then there is no decrease in the connection area between the oxidation gas supply path 63 and the oxidation gas supply hole 225.

As shown in FIG. 8 (*c*), the fuel gas supply hole 237 on the anode facing plate 23 and the fuel gas supply path slit 247 on the intermediate plate 24 have the same constitution. The expanded illustration is omitted, but the oxidation gas exhaust hole 226 and the oxidation gas exhaust path slit 246, as well as the fuel gas exhaust hole 238 and the fuel gas exhaust path slit 248 also have the same constitution. Therefore, with the separator 25 of the first variation, when the three flat plates are joined and the separator 25 is formed, when the cathode facing plate 22 or the anode facing plate 23 are displaced in the up-down direction or the left-right direction in relation to the intermediate plate 24 due to imposition error, it is possible to suppress a reduction or disappearance of the connection area between each reaction gas flow path (61 to 64) and each corresponding reaction gas supply or exhaust hole (225, 226, 227, 228).

Figure 9:
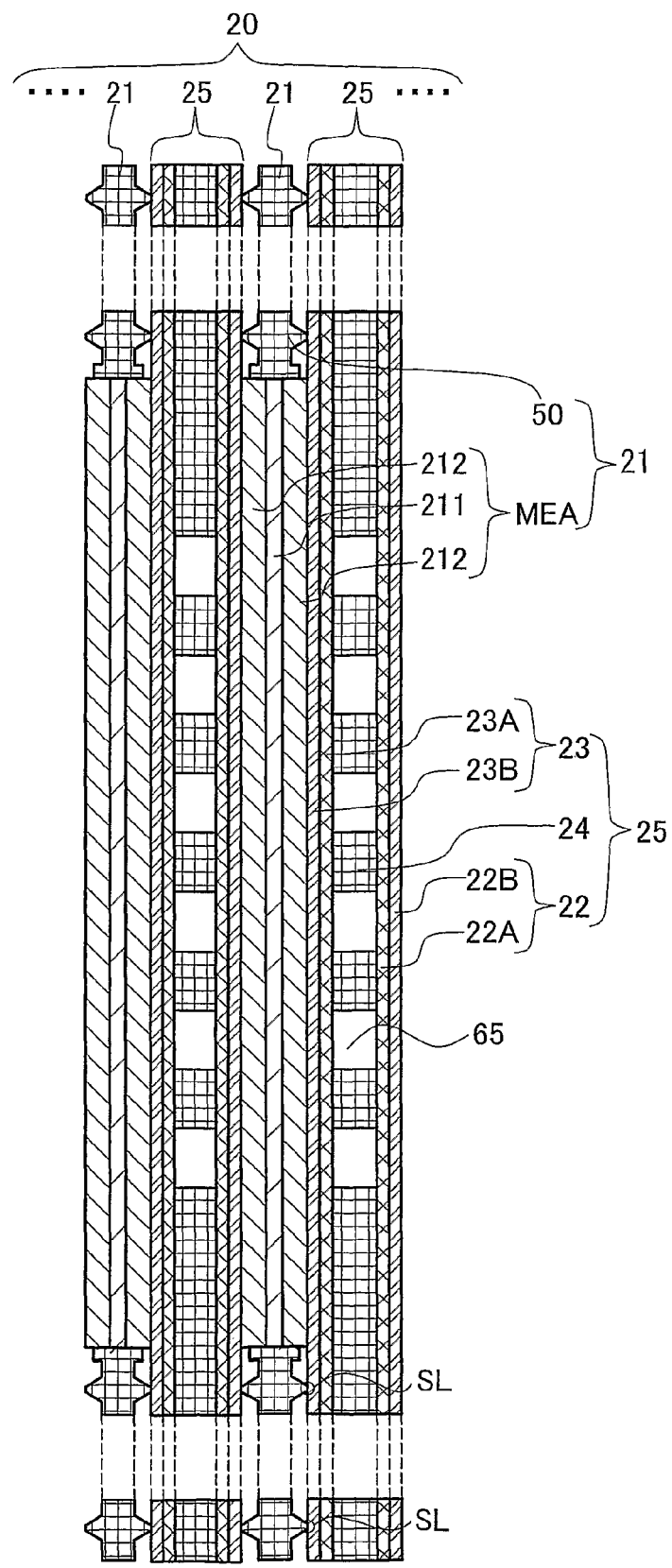
FIG. 9 shows a cross section view of the module constituted by lamination of the separator of the second variation together with the seal integrated type MEA 21.

The separator 25 of the second variation is described while referring to FIG. 9. FIG. 9 is a cross section of the module 20 constituted by laminating the separator 25 of the second variation together with the seal integrated type MEA 21. Different from the separator 25 of the embodiment described above (see FIG. 2), with the separator 25 of the second variation, the cathode facing plate 22 and the anode facing plate 23 are constituted using cladded material having a two layer structure. The cladded material means material made of different type metals joined by rolling, or the like.

The cathode facing plate 22 which is a cladded material includes a first layer 22A having a contact surface with the intermediate plate 24 and a second layer 22B having a facing surface with the MEA. Similarly, the anode facing plate 23 which is a cladded material includes a first layer 23A having a contact surface with the intermediate plate 24 and a second layer 23B having a facing surface with the MEA. The second layers 22B and 23B are made of material with higher corrosion resistance than the first layers 22A and 22B. For example, the first layers 22A and 22B are constituted by a stainless steel (SUS), and the second layers 22B and 23B are constituted by titanium or a titanium alloy. The first layers 22A and 22B may be constituted by titanium, and the second layers 22B and 23B may be constituted by a titanium palladium alloy.

With the electrochemical reaction of the fuel cell, hydrogen ions are generated, so the generated water is acidic. The surfaces facing the MEA of the cathode facing plate 22 and the anode facing plate 23 contact such generated water, so when electric potential is applied by power generation, corrosion occurs easily. With the separator 25 of the second variation, the layer on the side of the surface facing the MEA is constituted by a material with high corrosion resistance, so corrosion resistance is increased. Also, by using cladded material, it is possible to suppress the increase in contact resistance more than in a case of using a separate corrosion resistant material.

The separator 25 of the third variation is described while referring to FIG. 10. FIG. 10 shows a plan view of each structural part of the separator of the third variation and the seal integrated type MEA. With the embodiment described above, there is the same number of the oxidation gas supply holes 225 formed on the cathode facing plate 22 and the oxidation gas supply path slits 245 formed on the intermediate plate 24, and there is one-to-one correspondence between the oxidation gas supply holes 225 and the oxidation gas supply path slits 245. In contrast to this, with the separator 25 of the third variation, 2n (even number) of oxidation gas supply holes 225 are formed on the cathode facing plate 22, and n oxidation gas supply path slits 245 are formed on the intermediate plate 24. Then, at one end of one oxidation gas supply path slit 245 are connected two oxidation gas supply holes 225. Specifically, there is a two-to-one correspondence of the oxidation gas supply holes 225 and the oxidation gas supply path slit 245. In this case, there is the advantage that it is possible to broadly set the width of oxidation gas supply path 63. In this way, the correlation between the oxidation gas supply holes 225 and the oxidation gas supply path slits 245 does not necessarily have to be one-to-one, and it is acceptable as long as setting is done to ensure the necessary strength for suppressing deformation and considering to ensure the necessary flow path width.

While the present invention has been described on the basis of the embodiment and variations, these embodiment and variations of the invention described herein are merely intended to facilitate understanding of the invention, and implies no limitation thereof. Various modifications and improvements of the invention are possible without departing from the spirit and scope thereof as recited in the appended claims, and these will naturally be included as equivalents in the invention.

The invention claimed is:

1. A fuel cell separator comprising:
   a first electrode facing plate having a first cell-reaction region provided to face a first electrode of a first membrane electrode assembly when constituting a fuel cell, wherein the first cell-reaction region is flat and a gas flow path is not formed on the first cell-reaction region:
   a second electrode facing plate having a second cell-reaction region provided to face a second electrode of a second membrane electrode assembly when constituting a fuel cell, wherein the second cell-reaction region is flat and a gas flow path is not formed on the second cell-reaction region; and
   an intermediate plate held between and in direct contact with the first electrode facing plate and the second electrode facing plate;
   wherein the first electrode facing plate, the second electrode facing plate and the intermediate plate respectively comprise a reaction gas supply manifold opening that forms a single reaction gas supply manifold to which a reaction gas is to be supplied, wherein the single reaction gas supply manifold pierces the separator in the thickness direction,
   wherein the first electrode facing plate further comprises a plurality of reaction gas supply holes that pierce the first electrode facing plate in the thickness direction and are formed at an end of the first cell-reaction region, and
   wherein the intermediate plate further comprises a plurality of reaction gas supply path openings that pierce the intermediate plate in the thickness direction and form reaction gas supply paths, wherein each of the reaction gas supply paths has one end connected to the single reaction gas supply manifold and the other end connected to at least one of the plurality of reaction gas supply holes formed on the first electrode facing plate;
   wherein the reaction gas supply manifold includes a fuel gas supply manifold for supplying fuel gas, and
   wherein the fuel gas supply manifold is positioned adjacent to a corner of the intermediate plate.

2. A separator according to claim 1,
   wherein the number of the reaction gas supply path openings and the number of the reaction gas supply holes are the same, and
   wherein the reaction gas supply path openings correspond one-to-one with the reaction gas supply holes.

3. A separator according to claim 1, wherein
   the flow volume of reaction gas supplied from the plurality of reaction gas supply holes to the first electrode is controlled according to the shape and the dimension of the reaction gas supply path and the reaction gas supply holes.

4. A separator according to claim 3, wherein the plurality of reaction gas supply path openings respectively have the same shape and dimensions.

5. A separator according to claim 3, wherein the plurality of reaction gas supply holes respectively have the same shape and dimensions.

6. A separator according to claim 4, wherein the plurality of reaction gas supply path openings are formed to be respectively parallel to each other.

7. A separator according to claim 6,
   wherein the first electrode facing plate is provided to face the cathode electrode of the first membrane electrode assembly, and
   wherein the plurality of reaction gas supply path openings are arranged from one end across to the other end of one edge of the first cell-reaction region.

8. A separator according to claim 1,
   wherein the first electrode facing plate, the second electrode facing plate and the intermediate plate further respectively comprise a reaction gas exhaust manifold opening that forms a reaction gas exhaust manifold from which reaction gas to be exhausted, wherein the reaction gas exhaust manifold pierces the separator in the thickness direction,
   wherein the first electrode facing plate further comprises a plurality of reaction gas exhaust holes that pierce the first electrode facing plate in the thickness direction and are formed at an end of the first cell-reaction region and of the side opposite the end at which the reaction gas supply holes are formed, and
   wherein the intermediate plate further comprises a plurality of reaction gas exhaust path openings that pierce the intermediate plate in the thickness direction and form reaction gas exhaust paths, wherein each of the reaction gas exhaust paths has one end connected to the reaction gas exhaust manifold and other end connected to at least one of the plurality of reaction gas exhaust holes.

9. A separator according to claim 2, wherein
a width of the reaction gas supply hole or the reaction gas exhaust hole is wider than a width of the connected reaction gas supply path or the connected reaction gas exhaust path.

10. A separator according to claim 1,
wherein at least one of the first electrode facing plate and the second electrode facing plate comprise:
a first layer having a contact surface with the intermediate plate; and
a second layer having a facing surface provided to face the membrane electrode assembly when constituting the fuel cell, wherein the second layer is made of a material having a higher corrosion resistance than a material of the first layer.

11. A separator according to claim 10, wherein
the combination of the material of the first layer and the material of the second layer is one of the following:
the first layer is stainless steel and the second layer is titanium or a titanium alloy
the first layer is titanium and the second layer is a titanium palladium alloy.

12. A method of producing a separator according to claim 1, wherein
the reaction gas supply manifold opening, the reaction gas supply holes, and the reaction gas supply path openings are formed by a punch cutting process.

13. A method of producing a separator according to claim 8, wherein
the reaction gas exhaust manifold opening, the reaction gas exhaust holes, and the reaction gas exhaust path openings are formed by a punch cutting process.

14. A fuel cell comprising:
a first membrane electrode assembly having a first electrode;
a second membrane electrode assembly having a second electrode; and
a separator according to claim 1, wherein
the first cell-reaction region faces the first electrode and the second cell-reaction region faces the second electrode.

15. A fuel cell according to claim 14, wherein
a porous layer arranged between the first electrode and the first electrode facing plate functions as a reaction gas flow path for flowing the reaction gas, and
the pressure loss of the reaction gas for the reaction gas supply paths and the reaction gas supply holes is greater than the pressure loss of the reaction gas for the porous layer, whereby the flow volume of the reaction gas supplied from the plurality of reaction gas supply holes to the first electrode is controlled by the pressure loss of the reaction gas for the reaction gas supply path and the reaction gas supply holes.

* * * * *